United States Patent [19]

Ayers et al.

[11] Patent Number: 4,789,269
[45] Date of Patent: Dec. 6, 1988

[54] WINGED PIPELAYING

[75] Inventors: Ray R. Ayers; Frans Kopp, both of Houston, Tex.

[73] Assignee: Shell Oil Company, Houston, Tex.

[21] Appl. No.: 45,742

[22] Filed: Apr. 29, 1987

Related U.S. Application Data

[63] Continuation of Ser. No. 835,080, Feb. 28, 1986, abandoned.

[51] Int. Cl.⁴ .................................................. F16L 1/04
[52] U.S. Cl. ..................................... 405/158; 405/171
[58] Field of Search ............... 405/63, 66, 154, 158, 405/162, 166–172; 114/244, 245; 441/133

[56] References Cited

U.S. PATENT DOCUMENTS

| | | | |
|---|---|---|---|
| 2,731,800 | 1/1956 | Collins | 405/171 X |
| 3,531,761 | 9/1970 | Tickell et al. | 114/245 X |
| 3,531,762 | 9/1970 | Tickell | 114/245 X |
| 4,033,278 | 7/1977 | Waters | 114/245 |
| 4,078,513 | 3/1978 | Dorsch | 405/63 X |
| 4,107,802 | 8/1978 | Patinet et al. | 405/171 X |
| 4,107,933 | 8/1978 | Lamy | 405/171 |
| 4,326,821 | 4/1982 | Stefens | 405/171 |
| 4,648,745 | 3/1987 | Hulsbergen | 405/159 |

FOREIGN PATENT DOCUMENTS 69446  1/1983  European Pat. Off. ............ 405/162

Primary Examiner—David H. Corbin

[57] ABSTRACT

Subsea pipelay is accomplished by flying the pipestring underwater with the use of wings which provide sufficient lift to maintain the pipestring off bottom as it is towed.

11 Claims, 3 Drawing Sheets

FIG.7
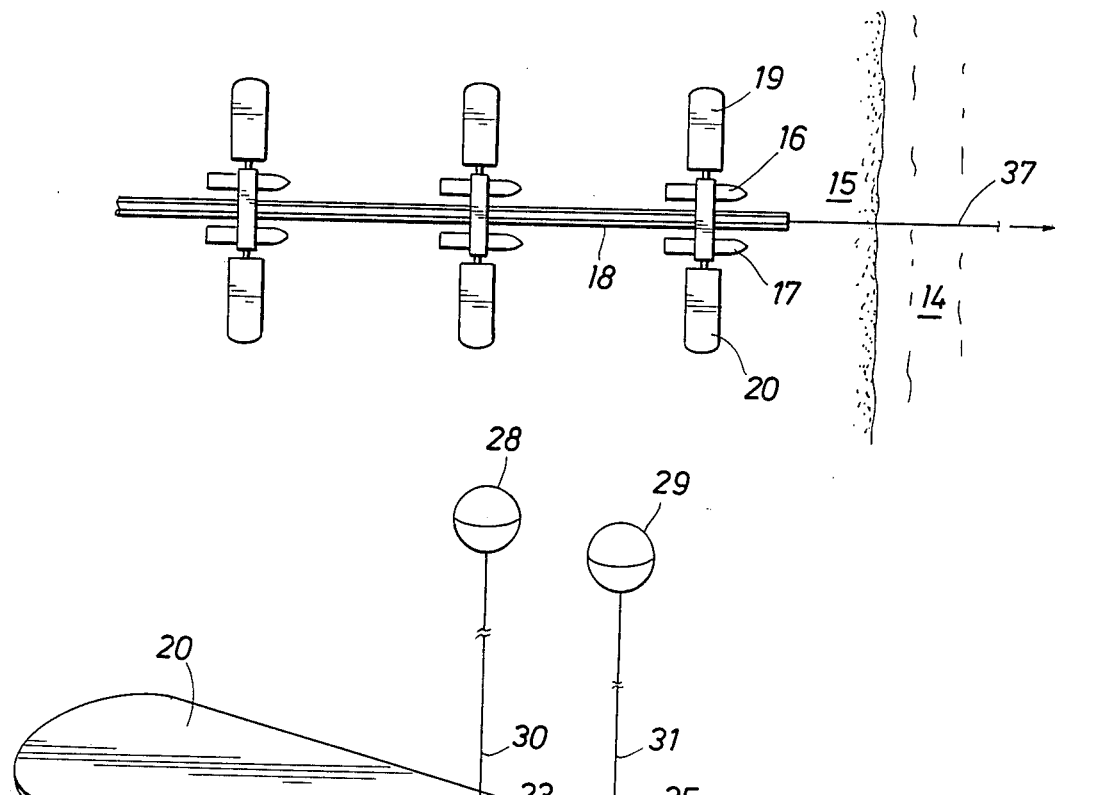
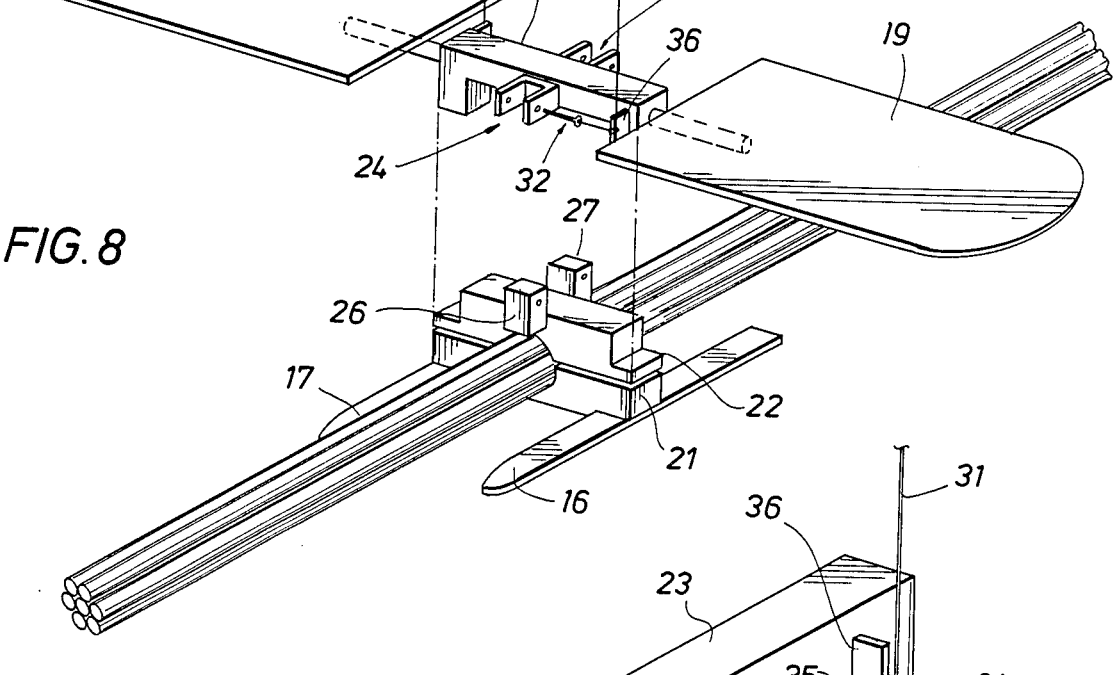
FIG.8
FIG.9
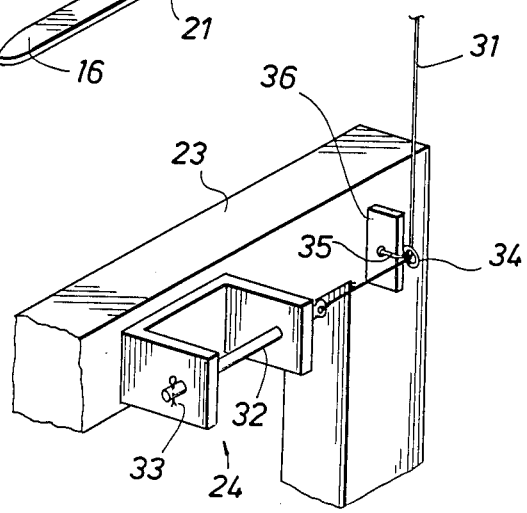

WINGED PIPELAYING

This is a continuation of application Ser. No. 835,080, filed Feb. 28, 1986, now abandoned.

BACKGROUND OF THE INVENTION

Offshore submerged pipelines are installed usually either by dragging the pipeline along the seabottom, pulling the pipeline while maintaining it in buoyant condition, or deploying the pipeline from a conventional lay barge. Pipe laying procedures involving moving contact between the pipeline and either the seabed or handling equipment may be damaging to the pipeline, particularly if the pipeline is coated with a material sensitive to abrasion, or in cases where existing pipelines need to be crossed and contact with them needs to be avoided.

A principal purpose of the present invention is to provide a system for installing offshore submerged pipelines by pulling them through the water while providing means for supporting the pipeline during the pull so that the pipeline does not touch the seabed and avoids abrasive contact with the seabed and other obstructions or existing pipelines.

Applicants are not aware of any prior art references which, in their judgment as those skilled in the pipeline art, would anticipate or render obvious the novel pipelay system of this invention; however, for the purposes of fully developing the background of the invention and establishing the state of the requisite art, the following are set forth: U.S. Pat. Nos. 3,849,997; 4,107,933; 4,191,494; 4,326,821; 4,474,507.

SUMMARY OF THE INVENTION

In accordance with the invention there is provided a system for installing offshore submerged pipelines comprising wing means operable to permit a submerged pipeline to be pulled above seabottom. More preferably, the invention comprises means for gripping at least one pipeline at longitudinally spaced intervals, and detachable wing means secured to the gripping means and operable to permit the pipeline to be pulled above the seabottom. Means may also be provided for detaching and retrieving the wing means after the pipeline has been pulled to a predetermined location. Optionally, the gripping means may be functional to support the pipeline above the shore or seabottom when the pipeline is not being pulled.

Other purposes, features and advantages of the invention will be apparent to one skilled in the art from the following detailed description of a preferred embodiment thereof taken in conjunction with the accompanying drawings.

BRIEF DESCRIPTION OF THE DRAWINGS

FIG. 7 is a plan view of the invention wherein a pipeline bundle is pulled into the water from an onshore location.

FIG. 8 is an exploded perspective on a larger scale of the gripping and wing means for supporting the pipe bundle shown in FIG. 7 and for permitting it to be pulled into the water and flown above the seabed.

FIG. 9 is a fragmentary detail of the detachable means for attaching the wing assembly to the pipe gripping assembly shown in FIG. 8 whereby the former, after the pipe bundle has been pulled to a final location, may be detached by remote control from the surface and retrieved.

DETAILED DESCRIPTION OF PREFERRED EMBODIMENTS

Figure 1:
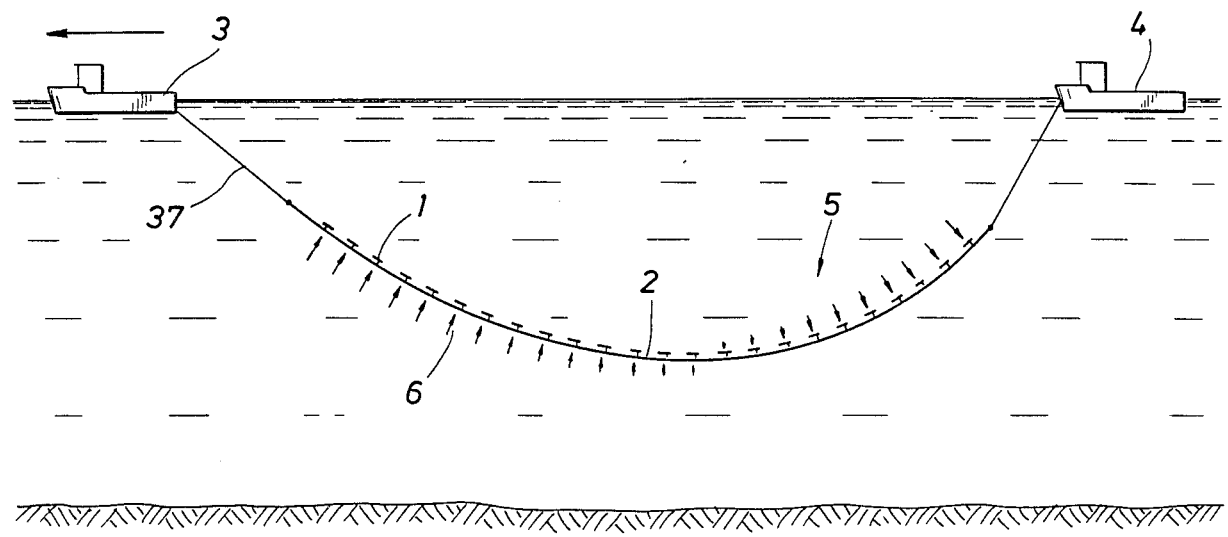
FIG. 1 is a view of the invention wherein a pipestring is being towed between two tugs using fixed wings attached to the pipestring.

"Flying" pipelines to avoid contact with the seabed, is not a new concept, but previous applications have used means other than the present invention to lift the pipe off the seabed. As shown in the above cited U.S. Pat. No. 4,474,507, the pipe is being installed by the so-called "off-bottom tow" method wherein the pipe itself (with or without additional buoyancy tanks attached) is kept at a predetermined height above the seabed by attaching chains at certain intervals. This method also has received the name "controlled depth tow method" and requires making up a pipeline or pipe bundle at an onshore location. The pipe has a slightly positive buoyant submerged weight when empty. Chains are attached to give the total assembly a slightly negative submerged weight. The pipe ends are attached with tow cables to a leading and trailing tug. If the assembly is not moving the pipe will float at some height above the seafloor. The weight of the chain hanging from the pipe, but not resting on the seabed, is equal in magnitude to the positive buoyancy of the pipe itself, and the remainder of the chain on the seafloor provides resistance against hydrodynamic forces from lateral currents. When the tow starts, the chains will start to deviate from their vertical position and the pipe will start to lift off from the bottom. The reason for this phenomenon is that the hydrodynamic drag force on the chains splits into two components: an upwards force which reduces the total system submerged weight and a horizontal force. Thus, the pipeline configuration will take the shape of a catenary. When the tow speed increases, the inclination of the chains, measured from the vertical, increases also, and thus provides a greater upwards force. To some extent this upwards force would also be present without the use of chains, due to the hydrodynamic drag on the pipeline itself. It is, of course, possible to lift the pipe totally off the bottom, without towing it, but the required tension in the tow cables would be very large.

The chains are not an optimum means to provide this upwards force, because they also create a drag force along the pipe axis, and they have a large weight to start with. In comparison, attaching wings to the pipeline in accordance with the present invention has the following main advantages:

1. Wings are much more efficient in providing lift force, with little additional drag. The latter reduces tow horsepower requirements.

2. Instead of requiring the pipe itself to have a positive buoyancy, the pipe now can have a negative buoyancy. This is in particular of importance in deep water applications: the requirement to withstand external pressure in the empty condition leads to low diameter/thickness ratios, and thus high negative buoyancy, unless the pipe is pressurized to balance the external pressure. The only way to make a pipe or bundle positively buoyant, is to add buoyancy tanks, or to pressurize the line during tow-out. In fact, depending on the material, the wings themselves may be buoyant and thus provide additional lift force.

The functional requirements of the wings are summarized below:

1. The wings provide predictable lift force under varying conditions (change in tow speed, change in pipe configuration).
2. The wing assembly does not damage the pipeline.
3. The wings are detachable without the use of divers.
4. The wing assembly provides stability to the pipe, i.e., it does not cause the pipe to roll around its longitudinal axis.
5. The wing assembly withstands and transfers different forces, the largest usually being wave impact forces during launch of the pipe through the surf zone.

Principles of airfoil theory known in the art are applicable to determine the magnitude of the lift force as a function of tow speed, wing geometry, and wing inclination relative to the direction of the fluid flow, even though operation is in relatively low Reynolds numbers. Airfoils have seen extensive use for trimming purposes, for example, on submarines and on seismic floats.

A key parameter is the angle of the wing to the direction of the fluid flow (which is for simplicity assumed to be parallel to the longitudinal axis of the pipe). The pipe configuration will change from an essentially straight position to a catenary during the course of increasing tow speed from zero to the desired level. Each point along the pipeline, therefore, undergoes a change in inclination. Having the wings 1 rigidly attached along the axis of pipe 2 towed between tugs 3 and 4 will not be efficient (FIG. 1), because the trailing end of the pipe experiences a downward directed force 5 on the wings while the forward end of pipe 2 experiences an upward force 6. In some cases, it is desirable to move the pipe back in the direction it came from, using the trailing tug 4 as the leading tug instead. It is therefore preferred to have some means to adjust the inclination of the wing.

Figure 2:
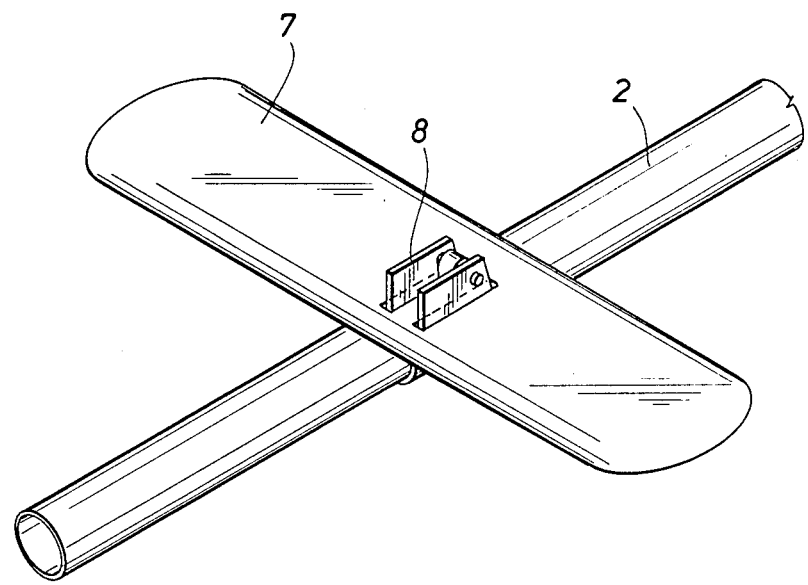
FIG. 2 shows a one section wing.

The wings can comprise one or two sections (FIGS. 2 and 7). If the wing 7 comprises one section, it can pivot around a hinge 13 (FIG. 3) with tails 8 (FIG. 2) providing lateral strength. Preferably, the wings 7 are not left on the pipe 2 after installation of the pipe because (1) they may have a negative effect on hydrodynamic stability of the pipe, and (2) using wings may not be economically viable if they are not re-used. Detachment of the wings 7 may be achieved remotely or with use of a remotely operated vehicle (not shown).

A long pipe string which is towed without buoys or chains, will roll around its longitudinal axis. Wing design is such that this roll is avoided. This is achieved by constructing the wing assembly such that, if the assembly is positively buoyant, its center of gravity is above the center of gravity of the pipe string, and if the wing assembly is negatively buoyant, its center of gravity is below the center of gravity of the pipe string. This is also important during start-up of the tow procedure, when the pipe is close to the seabed: the wings are not allowed to dig into the seabed or hook behind an obstruction.

It is likely, as above stated, that the largest forces on the wing 7 will be due to wave impact forces during pipe launch from shore (aside from accidental loads). Vertical forces on the wing 7 (downwards and upwards) can be orders of magnitude higher than those encountered during tow. Other forces are hydrodynamic forces during tow, impact forces with the seabed, hydrostatic forces, and handling forces during installation on the pipe and launch from the beach.

Based on the foregoing requirements, the wing components are: (1) the wing itself, (2) wing inclination adjustment mechanism, (3) wing rotation mechanism, (4) wing attachment to pipe, (5) wing release mechanism, and (6) pipe slides.

It is probably more advantageous to have relatively small wings at close intervals, say one every joint or two joints, than larger wings, further apart. The smaller the wing area, the easier the handling becomes. Chances of damage or inadvertently hitting an obstruction decrease also. In addition, "mass production" may become attractive, especially if the wings are made from moldable materials (high density foams, plastics). The wings preferably are light and they preferably have a solid cross section, to withstand the hydrostatic pressure. The low density of foams (about 20 lb/ft$^3$) results in positively buoyant wings, which increases the roll stability in the configurations shown. Wings preferably are placed symmetrically and comprise one or two sections (FIGS. 2 and 8), depending on primarily economic considerations.

The wings 7 are preferably made using syntactic foam, a high-density polyurethane, fiber reinforced polyester or epoxy. Manufacturing costs for the wing are low, especially if the cost of molds, etc. are spread out over several hundred units.

Figure 3:
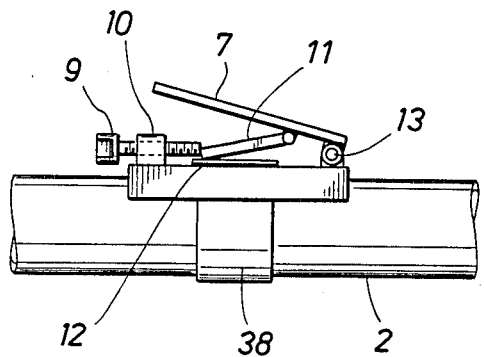
FIGS. 3 and 4 depict a wing inclination adjustment.
Figure 4:
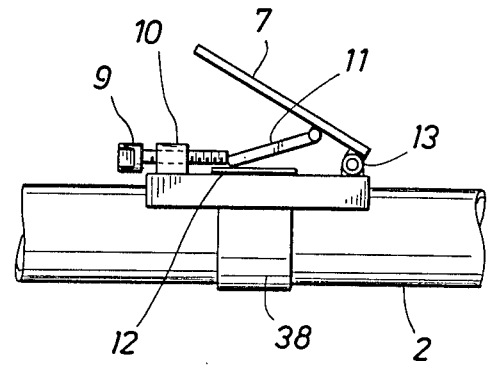

As above mentioned, it is preferred to have the capability to adjust the inclination of the wings 7. This inclination may be set prior to launch of the pipe 2, but this may not result in the desired lift force distribution during varying conditions under tow. It is unlikely that the inclination of the wings will be adjusted while towing (in which case the required torque to rotate the wing 7 would be high), so a simple, low torque mechanism is employed (FIGS. 3 and 4). This mechanism comprises screw bolt 9 extending through threaded holder 10 and activating rotating arm 11 which moves along slide 12 to swivel wing 7 about hinge 13. Torque to activate bolt 9 can be provided by a pre-loaded spring, a remotely operated vehicle equipped with an hydraulic arm, or by a small hydraulic cylinder (energy provided by an accumulator) which is activated by the remotely operated vehicle. Alternatively, inclinometers can be placed at regular intervals, with a system of transponders placed along the line, to automatically actuate the wing inclination mechanism. The rotating arm 11 and the hinge 13 may include hinge bolts (not shown) which will fail at a predetermined shear force. This will ensue that, if the wing accidentally gets caught behind an obstruction, the wing will shear off without damage to the pipe.

Figure 5:
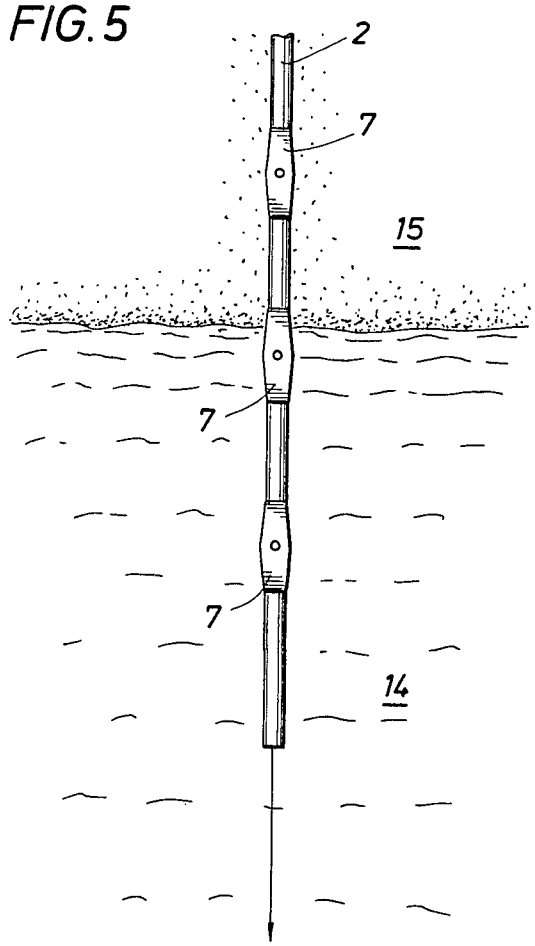
FIGS. 5 and 6 show wing rotation.
Figure 6:
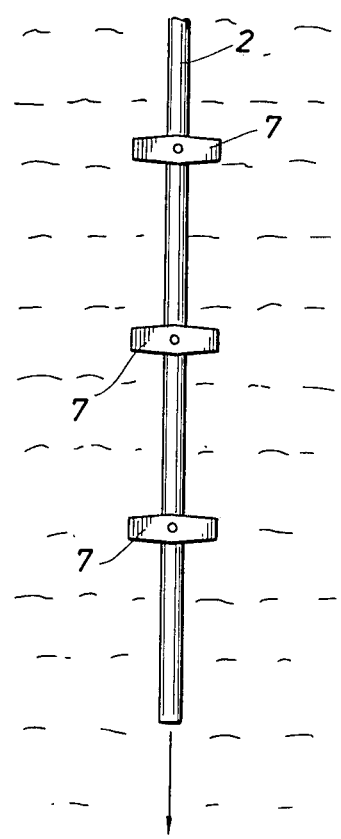

The wing assembly may experience the largest forces when being pulled through the surf zone. To minimize the exposure to on-rolling waves passing from surf zone 14 to beach 15, the wings 7 may be rotated 90 degrees (FIG. 5). A simple spring loaded system (not shown) may be activated by divers or a remotely operated vehicle, to rotate the wings 7 back into their proper position for tow (FIG. 6).

It is suitable in accordance with the invention to attach the wings 7 to the pipe Z or pipe bundle in several ways. Main considerations are given to ease of assembly, compatibility with movements between individual pipes, avoidance of damage to the pipeline, and ease of release. If launch forces can remain low, then clamps 38 do not have to transfer significant forces. The weight of the clamp preferably is kept low, and various materials other than steel, such as molded clamps made of a hard plastic, may be more economical. An emergency release preferably is incorporated, which releases the wing if it gets stuck, or hangs behind an obstruction. Various different release mechanisms are suitable for use with the invention. It can be a chain reaction type trigger mechanism, with a trigger rope or cutting cable along the pipe, or the clamps may be released individually. The mechanism shown in FIGS. 8 and 9 is a typical example of the latter.

The purpose of slides 16 and 17 as shown in FIGS. 7-9 is to prevent contact of the pipe with the beach 15 when the pipe is being launched, or when the tow speed is still too low for "lift-off". For the slides 16 and 17 to be successful, it is necessary to have a fairly close wing spacing (to avoid mid span contact between pipe and seabed) and to have a hard, and fairly smooth seabed surface, for example, a sandy soil. In soft mud, more commonly found in deeper waters, the slides sink into the seabottom and restarting a tow requires high tow forces. Some contact of coating and seabed over short distances may not be detrimental, while continuous contact over a long tow would be, so slides are not always necessary.

In FIG. 7, pipe bundle 18 is shown being pulled from the shore 15 into the surf zone 14 by a suitable towing means, while sliding on spaced pairs of slides 16 and 17 on the shore. Once the pipe bundle 18 is in the water, and the tow speed has increased sufficiently, wings 19 and 20 lift the pipe bundle 18 off the seabottom and cause it to fly in the water, whereupon the pipe bundle may be pulled to a desired location before depositing it on bottom. Thus, the pipe bundle 18 is kept out of contact with the seabed and may be moved eventually to a final location where the wing assemblies may be detached and retrieved. The ends of the pipes comprising pipe bundle 18 are sealed by closures (not shown) and are attached to or are an integrated part of a pull assembly (not shown) permitting attachment of tow cable 37.

The construction of the wing assembly is made clear from FIG. 8. At intervals of about 40 to 120 feet centers along the pipestrings, combination wing and clamping assemblies are provided for gripping the pipe bundle 18 and supporting it both above the land while being pulled into the sea and above the seabottom when the pipe bundle is under water, so that the pipe bundle will not touch the ground on the shore or the seabed during the placement. Details of one combination clamping and wing assembly appear in FIGS. 8 and 9. Each member of a pair of cross ties 21 and 22 is suitably grooved to receive and clamp between the ties the pipe bundle 18. This clamping assembly may be used with one, two or many pipestrings or pipe bundles which can be arranged not only side-by-side but also above each other, either aligned or staggered, but preferably parallel. The bottom tie 21 is notched on the top side to receive the pipe bundle 18 and the top tie 22 is notched on the bottom side to nestle the pipe bundle 18 therebetween. The upper tie is then bolted or otherwise fastened to the lower tie by means not shown and also to the sleds or skids 16 and 17, thereby forming a structure which firmly binds the pipe bundle to the clamping assembly and also the sleds or skids as well. The ties may also be attached by releasable means to permit burying the pipelines. Attachable to the tie 22 is an axle 23 and wings 19 and 20 which form parts of the wing assembly. Preferably, the wings 19 and 20 are rotatably attached to the clamping assembly. Active means (not shown) may be utilized to provide rotation of the wings. Flanges 24 and 25 extend from the front and back faces of the axle 23, respectively, and have apertures which match with the apertures shown in lugs 26 and 27. Buoys 28 and 29 are attached via lines 30 and 31 to eyebolts 32 on one face of the axle 23 and another eyebolt (not shown) on the opposite face of axle 23 to a shear pin 33 at the end of eyebolt 32 and also at the end of line 30 (not shown) which are insertable into the matching holes in flanges 24 and 25 and lugs 26 and 27. Manifestly, a single buoy could be employed instead of the double buoys 28 and 29.

As more clearly shown in FIG. 9, the line 31 passes through a ring 34 which is, in turn, attached to a ring 35 which is affixed to flange 36. Line 31 then attaches to the eyebolt 32 which passes through the holes in the flanges 24 and at the opposite end thereof, is attached to a shear pin 33. When it is desired to release the eyebolt from flanges 24 and 25, and lugs 26 and 27, respectively located between the flanges, so that the wings 19 and 20 may be retrieved at the surface, a suitable force is exerted upon buoys 28 and 29 and lines 30 and 31 to break the shear pin 33 and the similar shear pin on the opposite side of axle 23 whereupon the wings 19 and 20 may be retrieved at the surface. This is, of course, after the pipe bundle 18 has been towed to a desired on-bottom location. When the force is exerted to break the shear pins and release the wing assemblies from the gripping assembly, the eyebolt 32 preferably does not pass through the ring 34 but catches thereat and permits retrieval of the wing assembly by means of the lines 30 and 31.

The foregoing description of the invention is merely intended to be explanatory thereof. Various changes in the details of the described method and apparatus of the invention may be made within the scope of the appended claims without departing from the spirit of the invention.

What is claimed is:

1. An apparatus for towing at least one submerged pipeline above-seabed comprising:
   tow means attached to the pipeline; and
   at least one wing attached to the pipeline and positioned to provide lifting force to the pipeline when the pipeline is being towed, said wing being rotatable from a substantially perpendicular alignment to a substantially lateral alignment with the pipeline in a non-towing mode.

2. The apparatus of claim 1 including means for detaching and retrieving said wing after the pipeline has been pulled to a predetermined location.

3. The apparatus of claim 1 including means for supporting the pipeline above ground which is attached to clamps secured to the pipeline.

4. The apparatus of claim 3 wherein the support means are sleds or skids.

5. The apparatus of claim 1 including means for rotating said at least one wing to provide lifting force to the pipeline when the pipeline is towed.

6. The apparatus of claim 1 wherein the wing is inclinable relative to a horizontal axis.

7. The apparatus of claim 1 wherein the wing comprises pairs of foils rotatably attached to an axle secured to and detachable from clamps secured to the pipeline at spaced intervals along the length of the pipeline.

8. A method for towing at least one submerged pipeline above-seabed comprising:
   attaching tow means to the pipeline; and providing at least one wing secured to said pipeline and rotatable to provide lifting force to the pipeline as the pipeline is towed; and rotating said wing from being substantially perpendicularly aligned to being substantially laterally aligned with the pipeline in a non-towing mode.

9. The method of claim 8 including towing said pipeline to a desired location and releasing and retrieving said wing after the pipeline has been pulled to said location.

10. The method of claim 8 including supporting the pipeline above shore before the pipeline is towed to an offshore location.

11. The method of claim 8 including attaching the wings to a clamp assembly which grips the pipeline.

* * * * *